(12) United States Patent
Berglund

(10) Patent No.: US 9,445,543 B2
(45) Date of Patent: Sep. 20, 2016

(54) LAWN MOWER DECK LIFTING ASSEMBLY

(71) Applicant: Ariens Company, Brillion, WI (US)

(72) Inventor: Brent P. Berglund, Brillion, WI (US)

(73) Assignee: Ariens Company, Brillion, WI (US)

( * ) Notice: Subject to any disclaimer, the term of this patent is extended or adjusted under 35 U.S.C. 154(b) by 96 days.

(21) Appl. No.: 14/032,291

(22) Filed: Sep. 20, 2013

(65) Prior Publication Data

US 2014/0083070 A1    Mar. 27, 2014

Related U.S. Application Data

(60) Provisional application No. 61/703,907, filed on Sep. 21, 2012.

(51) Int. Cl.
     *A01D 34/00*    (2006.01)
     *A01D 34/74*    (2006.01)
     *A01D 34/64*    (2006.01)
     *A01D 34/66*    (2006.01)

(52) U.S. Cl.
     CPC ............... *A01D 34/74* (2013.01); *A01D 34/64* (2013.01); *A01D 34/661* (2013.01)

(58) Field of Classification Search
     CPC .......... A01D 34/74; A01D 2034/645; A01D 2101/00; A01D 34/662; Y10S 56/22
     USPC .............. 180/6.48, 19.1, 19.3; 56/17.1, 15.8, 56/14.9, DIG. 22, 15.2, 14.7
     See application file for complete search history.

(56) References Cited

U.S. PATENT DOCUMENTS

| | | | | |
|---|---|---|---|---|
| 2,974,470 | A * | 3/1961 | Lucia ................. | A01D 34/80 56/11.9 |
| 5,816,033 | A * | 10/1998 | Busboom et al. ............ | 56/10.8 |
| 5,816,035 | A * | 10/1998 | Schick ................. | A01D 34/74 56/15.2 |
| 5,865,020 | A * | 2/1999 | Busboom et al. ........... | 56/320.1 |
| 5,927,055 | A * | 7/1999 | Ferree et al. .................. | 56/15.9 |
| 5,946,893 | A * | 9/1999 | Gordon ................. | A01D 34/64 56/15.7 |
| 6,494,028 | B2 * | 12/2002 | Moore .......................... | 56/17.1 |
| 6,588,188 | B2 * | 7/2003 | Dennis ........................ | 56/16.3 |
| 6,658,831 | B2 * | 12/2003 | Velke ..................... | A01D 34/64 56/14.7 |
| 6,688,089 | B2 * | 2/2004 | Velke et al. .................. | 56/14.7 |
| 6,868,658 | B2 * | 3/2005 | Velke ..................... | A01D 34/64 56/15.8 |
| 6,988,351 | B2 * | 1/2006 | Schick ................. | A01D 34/662 56/15.9 |
| 7,003,937 | B1 * | 2/2006 | Tarver .......................... | 56/17.1 |
| 7,013,626 | B1 * | 3/2006 | Strope ......................... | 56/15.8 |
| 7,197,863 | B1 * | 4/2007 | Sugden ........................ | 56/15.9 |
| 7,213,662 | B2 * | 5/2007 | Crumly .............. | A01D 34/6806 180/19.1 |
| 7,318,311 | B2 * | 1/2008 | Wright et al. ................. | 56/17.1 |
| 7,448,191 | B2 | 11/2008 | Elhardt et al. | |
| 7,451,586 | B1 * | 11/2008 | Papke et al. .................... | 56/15.9 |
| 7,540,134 | B1 | 6/2009 | Reich | |
| 7,540,135 | B2 * | 6/2009 | Strope .......................... | 56/17.1 |

(Continued)

FOREIGN PATENT DOCUMENTS

| | | |
|---|---|---|
| CA | 2275171 | 12/2000 |
| EP | 1958492 | 8/2008 |

*Primary Examiner* — Árpád Fábián-Kovács
(74) *Attorney, Agent, or Firm* — Michael Best & Friedrich LLP

(57) ABSTRACT

A deck lifting assembly for a lawn mower includes first and second lifting brackets and a biasing member interconnecting the first and second lifting brackets or to biasing brackets separate from the lifting brackets. The biasing member imparts a biasing force on each of the lifting brackets or biasing brackets to cause each lifting bracket to rotate in a direction that raises the mower deck.

15 Claims, 13 Drawing Sheets

(56) References Cited

U.S. PATENT DOCUMENTS

| | | | |
|---|---|---|---|
| 7,578,117 B2* | 8/2009 | Shaffer | A01D 34/74 56/17.1 |
| 7,607,283 B2* | 10/2009 | Wright | A01D 34/74 56/17.1 |
| 7,614,207 B2 | 11/2009 | Elhardt et al. | |
| 7,712,294 B2* | 5/2010 | Wright et al. | 56/17.1 |
| 8,104,552 B2* | 1/2012 | Papke et al. | 180/6.48 |
| 8,438,822 B2 | 5/2013 | Lancaster et al. | |
| 2002/0059788 A1* | 5/2002 | Velke et al. | 56/14.7 |
| 2002/0108363 A1* | 8/2002 | Bergsten | A01D 34/81 56/16.7 |
| 2002/0194826 A1* | 12/2002 | Schick et al. | 56/15.9 |
| 2003/0094071 A1* | 5/2003 | Eavenson et al. | 74/562 |
| 2006/0237240 A1* | 10/2006 | Crumly | 180/6.48 |
| 2007/0044446 A1* | 3/2007 | Wright | A01D 34/74 56/11.9 |
| 2008/0034723 A1* | 2/2008 | Wright | A01D 34/74 56/17.1 |
| 2008/0190087 A1 | 8/2008 | Elhardt et al. | |
| 2008/0229725 A1* | 9/2008 | Shaffer et al. | 56/17.1 |
| 2008/0256918 A1* | 10/2008 | Kubinski | A01D 34/74 56/17.1 |
| 2009/0031687 A1 | 2/2009 | Elhardt et al. | |
| 2009/0183481 A1 | 7/2009 | Lancaster et al. | |
| 2010/0011733 A1* | 1/2010 | Godfrey | A01D 34/662 56/17.5 |

* cited by examiner

LAWN MOWER DECK LIFTING ASSEMBLY

BACKGROUND

The present invention relates to a lifting assembly for the cutting deck of a lawn mower.

SUMMARY

In one embodiment, the invention provides a lawn mower comprising: a frame; a prime mover supported by the frame; a mower deck; a cutting blade mounted below the mower deck to cut vegetation under the mower deck; a first lifting bracket pivotably mounted to the frame and interconnected to the deck, the first lifting bracket being pivotable about a first horizontal axis in a raising direction to raise the deck and pivotable about the first horizontal axis in a lowering direction to lower the deck; a second lifting bracket pivotably mounted to the frame and interconnected to the deck, the second lifting bracket being pivotable about a second horizontal axis in a raising direction to raise the deck and pivotable about the second horizontal axis in a lowering direction to lower the deck; and a biasing member interconnecting the first lifting bracket to the second lifting bracket, the biasing member imparting a biasing force on each of the first lifting bracket and second lifting bracket, the biasing force imparting torque to the first lifting bracket in the raising direction for the first lifting bracket and imparting torque to the second lifting bracket in the raising direction for the second lifting bracket.

In some embodiments, the invention further comprises a first horizontal pivot shaft; and a third lifting bracket pivotable about the first horizontal axis in a lowering and raising direction to respectively lower and raise the deck; wherein the first lifting bracket and the third lifting bracket are rigidly mounted to the horizontal first pivot shaft about the first horizontal axis. In some embodiments, the invention further comprises a second horizontal pivot shaft; and a fourth lifting bracket pivotable about the second horizontal axis in a lowering and raising direction to respectively lower and raise the deck; wherein the second lifting bracket and the fourth lifting bracket are rigidly mounted to the second horizontal pivot shaft about the second horizontal axis. In some embodiments, the invention further comprises a second biasing member interconnected to both the third and fourth lifting brackets, and imparting a biasing force on each of the third and fourth lifting brackets, the biasing force imparting torque to the third lifting bracket in the raising direction for the third lifting bracket and imparting torque to the fourth lifting bracket in the raising direction for the fourth lifting bracket.

In some embodiments, the biasing member includes a linear spring; and wherein a first end of the linear spring is interconnected to the first lifting bracket and a second end of the linear spring is interconnected to the second lifting bracket. In some embodiments, rotation of the first lifting bracket in its raising direction and rotation of the second lifting bracket in its raising direction causes extension of the linear spring and an increase in the biasing force.

In some embodiments, the biasing member is interconnected to the first lifting bracket above the first horizontal axis and is interconnected to the second lifting bracket below the second horizontal axis, such that the raising direction for the first lifting bracket is the same as the raising direction for the second lifting bracket.

In some embodiments, the invention further comprises a preload adjustment mechanism for preloading the biasing member to a desired biasing force. In some embodiments, the biasing member includes a linear spring; and wherein the preload adjustment mechanism includes a threaded member interconnected to one end of the linear spring, the threaded member being rotated in a first direction to increase the preload and in a second direction to decrease the preload. In some embodiments, the preload adjustment mechanism is interposed between the biasing member and one of the lifting brackets.

In some embodiments, the invention further comprises a deck lift lever for actuation of the deck lifting assembly; wherein the applied force to the deck lift lever includes a maximum force and minimum force through the range of motion and wherein the minimum force is greater than 75% of the maximum force.

In another embodiment, the invention provides a lawn mower comprising: a frame; a prime mover supported by the frame; a mower deck; a cutting blade mounted below the mower deck to cut vegetation under the mower deck; a first pivot shaft supported for rotation with respect to the frame about a first pivot axis; a second pivot shaft supported for rotation with respect to the frame about a second pivot axis; a first lifting bracket rigidly mounted to the first pivot shaft for rotation with the first pivot shaft about the first pivot axis, the first lifting bracket being interconnected to the mower deck to raise and lower the deck in response to pivoting of the first lifting bracket; a second lifting bracket rigidly mounted to the second pivot shaft for rotation with the second pivot shaft about the second pivot axis, the second lifting bracket being interconnected to the mower deck to raise and lower the deck in response to pivoting of the second lifting bracket; and a biasing member interconnected to both the first and second pivot shafts, the biasing member providing a biasing force that applies torque to the first and second pivot shafts to bias the first and second lifting brackets in a raising direction.

In some embodiments, the biasing member is interconnected to at least one of the first and second lifting brackets. In some embodiments, the lawn mower further comprises at least one biasing bracket, separate from the first and second lifting brackets, rigidly mounted to at least one of the first and second pivot shafts; wherein the biasing member is interconnected to the at least one biasing bracket. In some embodiments, the lawn mower further comprises: a third lifting bracket rigidly mounted to the first pivot shaft, the third lifting bracket being interconnected to the mower deck to raise and lower the deck in response to pivoting of the third lifting bracket; and a fourth lifting bracket rigidly mounted to the second pivot shaft, the fourth lifting bracket being interconnected to the mower deck to raise and lower the deck in response to pivoting of the fourth lifting bracket. In some embodiments, the lawn mower further comprises a second biasing member providing a biasing force that applies torque to the first and second pivot shafts to bias the first, second, third, and fourth lifting brackets in the raising direction. In some embodiments, the second biasing member is interconnected to at least one of the third and fourth lifting brackets. In some embodiments, the lawn mower further comprises at least one biasing bracket, separate from the first, second, third and fourth lifting brackets, the at least one biasing bracket being rigidly mounted to at least one of the first and second pivot shafts; wherein the second biasing member is interconnected to the at least one biasing bracket. In some embodiments, the lawn mower further comprises a synchronizing arm interconnected to each of the first and second lifting brackets, the synchronizing arm imparting rotation to the first lifting bracket in response to rotation of the second lifting bracket.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
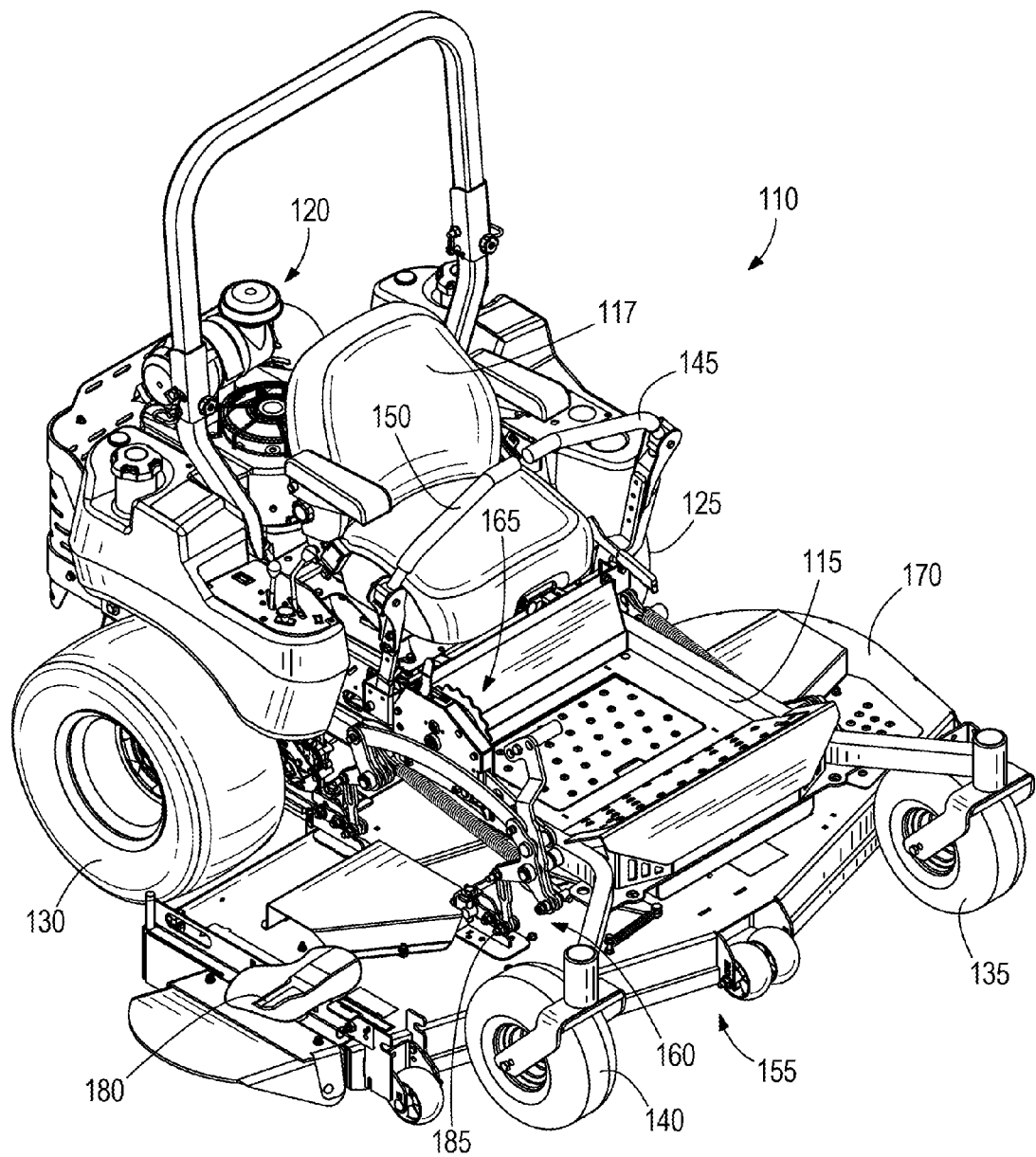
FIG. 1 is a perspective view of a lawn mower including a deck lifting assembly according to the present invention.
Figure 2:
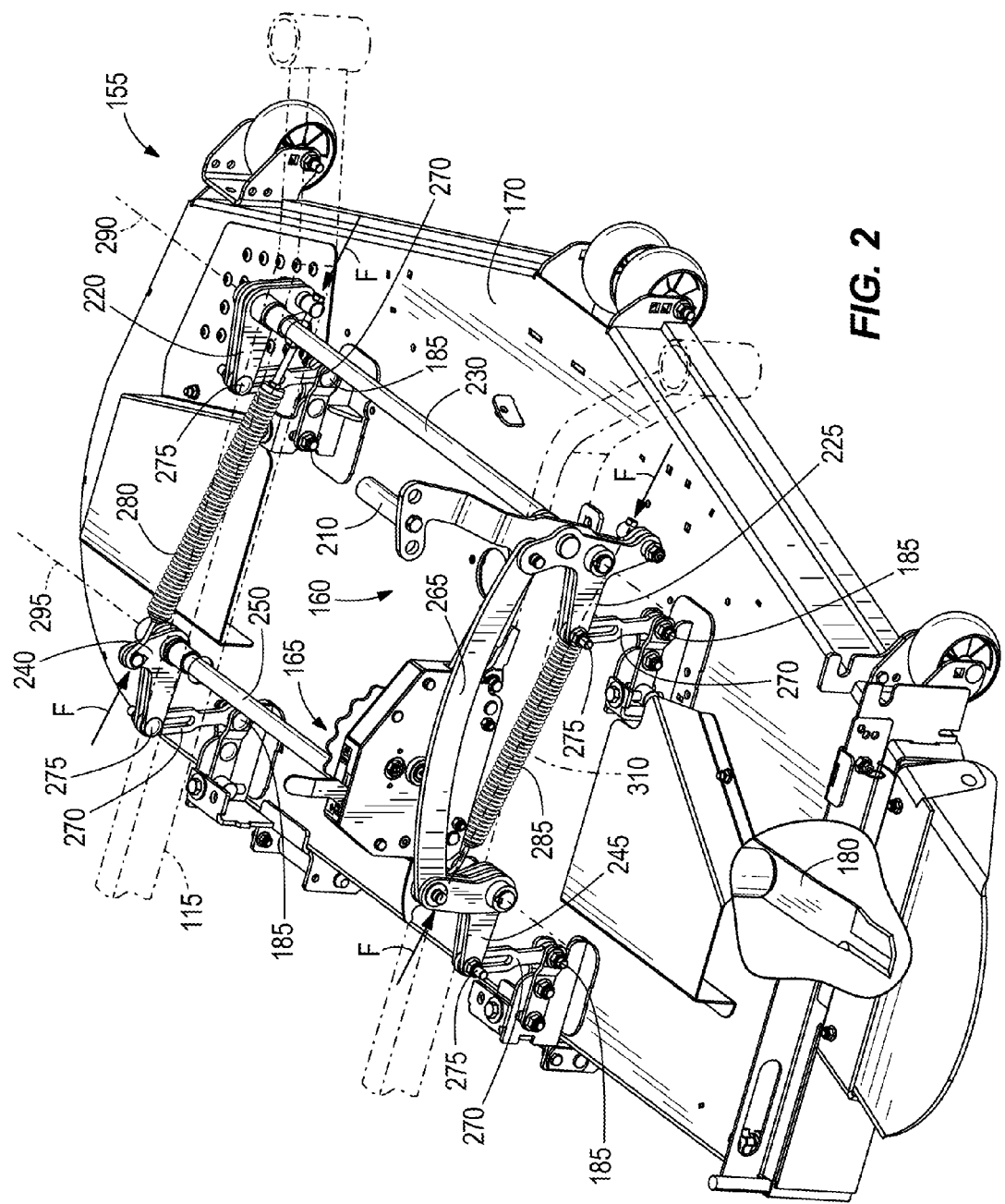
FIG. 2 is a perspective view of the deck lifting assembly.

FIGS. 1 and 2 illustrate a lawn mower 110 including a frame 115, a seat 117, a prime mover 120, left and right driven wheels 125, 130, left and right passive wheels 135, 140, left and right control arms 145, 150, a deck assembly 155, a deck lifting assembly 160, and a height-of-cut assembly 165. The terms "front," "rear," "left," and "right" will be used in this specification from the perspective of an operator seated on the lawn mower 110 during ordinary operation. The frame 115 is supported by the driven wheels 125, 130 and passive wheels 135, 140, and in turn supports the other components of the lawn mower 110. The prime mover 120 may be, for example, a gasoline powered internal combustion engine, but may also be any other type of prime mover such as an electric motor, a hybrid gas/electric motor, a fuel cell, or any other suitable device operating on a suitable fuel.

The left and right driven wheels 125, 130 are interconnected with the prime mover 120 through a power transmission and suitable hydraulic pumps and motors. The hydraulic pumps and motors are manipulated with the left and right control arms 145, 150, with the left control arm 145 controlling the direction and speed of rotation of the left driven wheel 125 and the right control arm 150 controlling the direction and speed of rotation of the right driven wheel 130.

The illustrated lawn mower 110 may be referred to as a zero-turn-radius lawn mower or ZTR lawn mower because when one of the control arms 145, 150 is pressed full forward and the other control arm 145, 150 is pulled full rearward, the lawn mower 110 will move in a very tight radius owing to one wheel rotating forward and the other rotating backwards. A ZTR lawn mower steers through the speed and direction difference of the two driven wheels. Further, the illustrated lawn mower 110 is a sitting lawn mower, in which the operator sits in the seat 117 during operation. The deck lifting assembly 160 discussed below is applicable to this type of lawn mower and also to any other type of lawn mower having a mower deck. Examples of other types of lawn mowers include large walk-behind units, standing mowers (in which the operator stands during operation), and tractors (in which a steering wheel is used instead of control arms, and the mower is not designed to execute zero-radius turns).

The deck assembly 155 includes a deck 170 and multiple cutting blades 180. The prime mover 120 drives rotation of the cutting blades 180 to cut vegetation (e.g., grass) under the deck 170. The deck 170 includes a plurality of mounting brackets with horizontal deck bolts 185.

The deck lifting assembly 160 includes a foot pedal 210, left and right front lifting brackets 220, 225, a front pivot shaft 230, left and right rear lifting brackets 240, 245, a rear pivot shaft 250, a right synchronizing arm 265, a lifting link 270 associated with each of the front and rear lifting brackets 220, 225, 240, 245, a lifting bolt 275 associated with each of the front and rear lifting brackets 220, 225, 240, 245, and left and right biasing members 280, 285. The foot pedal 210 is in the operator zone, which is defined as the region accessible by an operator on the lawn mower during ordinary operation. The foot pedal 210 is interconnected with the front pivot shaft 230 or with one of the front lifting brackets 220, 225, such that pivotal movement of the foot pedal 210 (e.g., under the influence of the operator's leg and foot) actuates the deck lifting assembly 160. Other types of deck lift actuators may be employed in place of or in addition to the foot pedal 210, including hand lever.

The left and right front lifting brackets 220, 225 are rigidly mounted to (i.e., fixed for rotation with) opposite ends of the front pivot shaft 230, and the left and right rear lifting brackets 240, 245 are rigidly mounted to (i.e., fixed for rotation with) opposite ends of the rear pivot shaft 250. The rigid mounting may be achieved through a keyed connection, as illustrated, but in other embodiments may be achieved with splines, a tapered shaft, or permanent interconnection via welding, for example. The front pivot shaft 230 defines a front pivot axis 290 and the rear pivot shaft 250 defines a rear pivot axis 295. The front lifting brackets 220, 225 pivot about the front pivot axis 290 with the front pivot shaft 230, and the rear lifting brackets 230, 235 pivot about the rear pivot axis 295 with the rear pivot shaft 250.

The right synchronizing arm 265 is pinned to each of the right front lifting bracket 225 and right rear lifting bracket 245. The right synchronizing arm 265 and the front and rear pivot shafts 230, 250 ensure that the front and rear lifting brackets 220, 225, 240, 245 pivot in a synchronized fashion.

The lifting links 270 are pinned at a top end to the lifting bolts 275 and at a bottom end to the deck bolts 185, and are thus interconnected between an associated lifting bracket 220, 225, 240, 245 and the deck 170. Each lifting bracket 220, 225, 240, 245 pivots about the associated horizontal pivot axis 290, 295 in a raising direction that lifts the deck 170 through the lifting link 270, and a lowering direction that permits the deck 170 to lower under the influence of gravity. In the illustrated embodiment, the raising direction of the right side lifting brackets 225, 245 is clockwise as seen from the right side. The raising direction of the left side lifting brackets 220, 240 is counterclockwise when viewed from the left side.

The left and right biasing members 280, 285 are provided in the form of linear coil springs, but in other embodiments can be any suitable alternative, such as air springs, torsion springs, compound springs having non-linear spring constants, and resilient material. The left biasing member 280 is interconnected at one end to the left front lifting bracket 220 and is interconnected at the opposite end to the left rear lifting bracket 240. The right biasing member 285 is interconnected at one end to the right front lifting bracket 225 and is interconnected at the opposite end to the right rear lifting bracket 245. The lifting brackets 220, 225, 240, 245 fulfill two purposes: they raise and lower the deck assembly 155 and they provide anchor points for the biasing members 280, 285. In another configuration (FIGS. 8-10, discussed below), the two purposes may be fulfilled by separate brackets. In such a configuration, one or both ends of the left and right biasing members 280, 285 can be interconnected to biasing brackets (or spring brackets) that are separate from the lifting brackets 220, 225, 240, 245 but that are rigidly mounted to the front and rear pivot shafts 230, 250. In view of this, the lifting brackets 220, 225, 240, 245 of this configuration may also be referred to as biasing brackets or as lifting/biasing brackets because of the dual purpose they serve.

The biasing members 280, 285 directly apply torque in the raising direction on both brackets to which they are interconnected, which assists the operator lifting the deck assembly 155 through the foot pedal 210. The illustrated biasing members 280, 285 are linear springs that are characterized by a spring constant that results in a biasing force F when the spring is extended. The spring force F acts on each of the lifting brackets to which the spring is attached, directed along a longitudinal extent or longitudinal axis 310 of the spring. The illustrated linear springs operate in tension and may therefore also be called tension springs.

Variations in the illustrated embodiment fall within the scope of the present invention. For example, the shafts 230, 250 could be configured at 90° from the positions shown, so they extend forward and rearward along the respective left and right sides. The deck lifting brackets 220, 225, 240, 245 would also be turned 90° so that they pivot about horizontal axes 290, 295 extending forward and rearward.

Referring now to FIGS. 3-7, the biasing members 280, 285 include a preload adjustment mechanism 315, which in the illustrated embodiment includes a male threaded member 320 and a female threaded member 325 that receives the male threaded member 320. In other embodiments, the preload adjustment mechanism 315 can take other forms, such as a turnbuckle between two springs, the two springs together defining the right or left "biasing member." The preload adjustment mechanism 315 permits the deck lifting assembly 160 to be used with decks of a wide variety of sizes and weights.

Details and operation of the deck lifting assembly 160 are illustrated in FIGS. 3-7, which illustrate the right side brackets 225, 245. The left side brackets 220, 240 operate on the same principles as the right side brackets 225, 245, and are essentially a mirror image of those illustrated in FIGS. 3-7 with the exception of some dimensions being different to accommodate components on the right and left sides, and the left side brackets 220, 240 not having mounting points for a synchronizing arm or pedal.

Each lifting bracket 220, 225, 240, 245 is mounted to the pivot shaft 230, 250 at a first connection point C1, is pinned to the lifting link 270 at a second connection point C2, and is pinned to an end of the biasing member 280, 285 at a third connection point C3. The first and second connection points C1, C2 define a first line L1 and the first and third C1, C3 connection points define a second line L2. In the illustrated embodiment, the angle between lines L1 and L2 for the front brackets 220, 225 is larger than 90° and the angle between lines L1 and L2 for the rear brackets 240, 245 is less than 90° (e.g.,) 80°.

Each lifting bracket 220, 225, 240, 245 bears a portion of the weight of the deck assembly 155. The weight of the deck assembly 155 acts vertically down along a line of weight W. The line of weight W acts on the second connection point C2. The torque applied to each lifting bracket 220, 225, 240, 245 by the weight of the deck assembly 155 is the weight borne by the bracket multiplied by the horizontal distance between the line of weight W and the horizontal axis 290, 295. The horizontal distance will be referred to as the deck moment arm DM. The deck moment arm DM equals the cosine of the angle between the first line L1 with respect to horizontal, multiplied by the distance between the first and second connection points C1, C2.

The torque applied to each lifting bracket 220, 225, 240, 245 by the biasing member 280, 285 equals the biasing force F multiplied by the perpendicular distance between the horizontal axis 290, 295 and the line of force F. The perpendicular distance will be referred to as the spring moment arm SM. The spring moment arm SM equals the sine of the angle between the second line L2 and the line of force F multiplied by the distance between the first and third connection points C1, C3.

Figure 3:
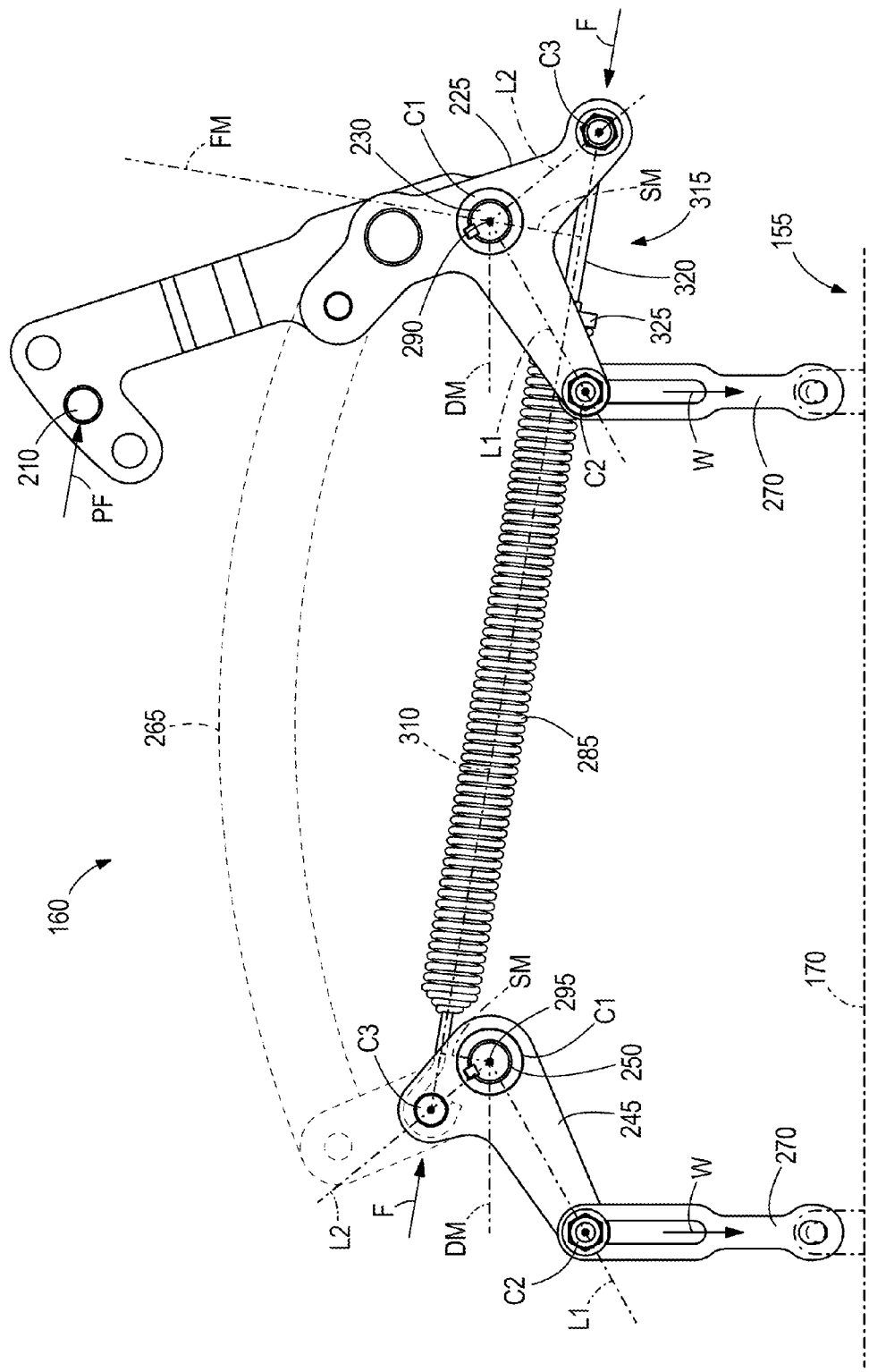
FIG. 3 is a side view of the deck lifting assembly in a full-down position.

FIG. 3 illustrates the deck lifting assembly 160 in the fully lowered or "full down" position, in which the deck assembly 155 is at the lowest end of its range of motion.

In the full-down position (FIG. 3), the first connection point C1 of the right front lifting bracket 225 and the front pivot axis 290 are above and forward of the second connection point C2 and above and rearward of the third connection point C3. The first connection point C1 of the right rear lifting bracket 245 and the rear pivot axis 295 are above and forward of the second connection point C2 and below and forward of the third connection point C3.

The terms "above" and "below" are used to indicate a position above a horizontal plane containing the referenced point or axis. The narrower term "directly above" or "directly below" will be used to indicate a position above a horizontal plane containing the reference point or axis and also in a vertical plane containing the reference point or axis. In other embodiments, the biasing members 280, 285 could both be interconnected above or below both of the bracket pivot points C1, in which case the brackets would pivot in opposite raising directions. In this regard, each lifting bracket 220, 225, 240, 245 can have its own raising direction and lowering direction, although in the illustrated embodiment all raising and lowering directions are the same.

The force F of the spring is as large as it can be in the full-down position, because the third connection points C3 of the brackets 225, 245 are farthest apart and the spring 285 is stretched as far as it will be stretched within the range of motion. The spring moment arm SM is as small as it will be in the range of motion, which offsets the large spring force F in terms of torque applied to the lifting brackets 225, 245. The deck moment arm DM is less than its maximum because the first line L1 is not horizontal.

Figure 4:
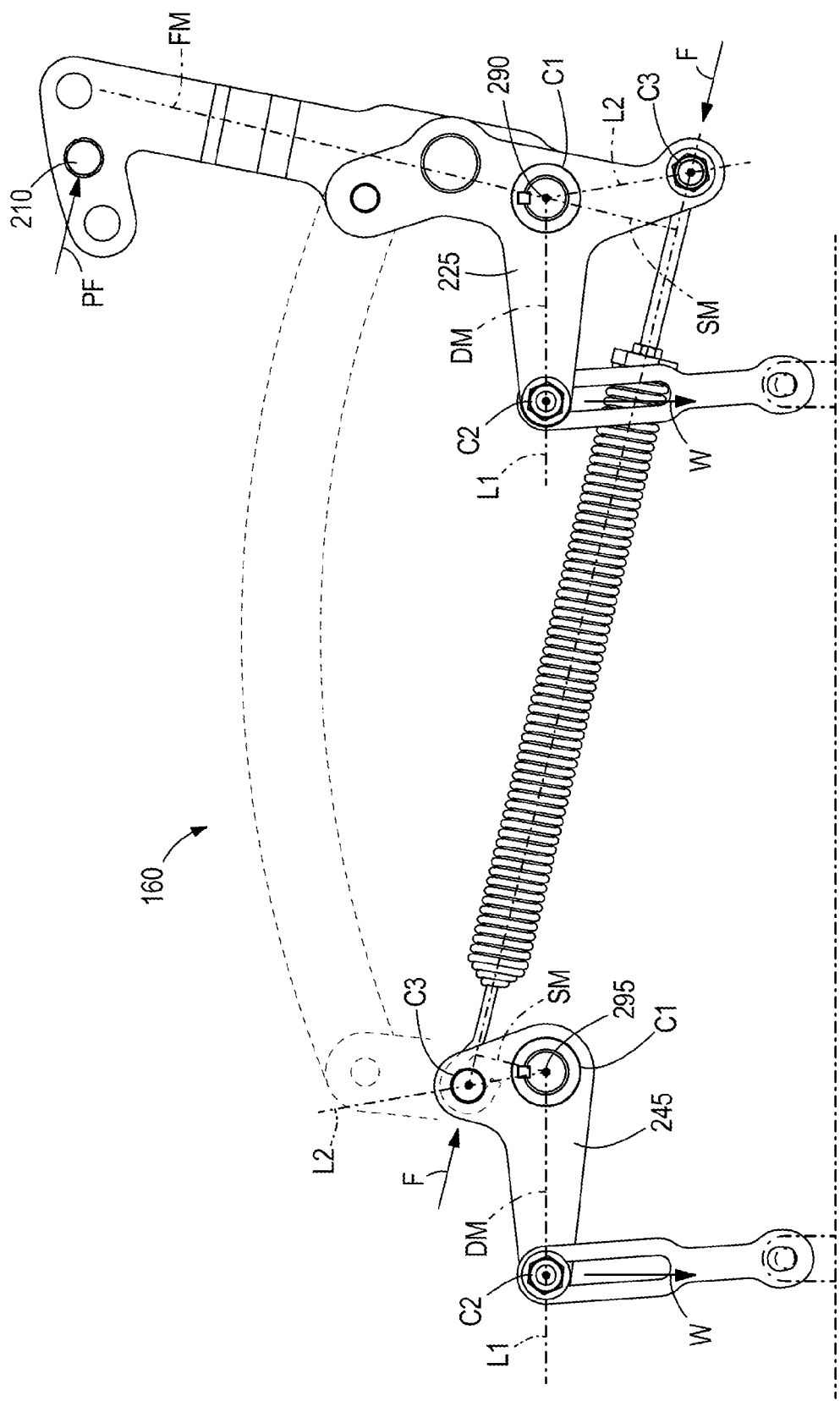
FIG. 4 is a side view of the deck lifting assembly in a second position.

FIG. 4 illustrates the deck lifting assembly 160 in a second position, in which the first connection point C1 of the right front lifting bracket 225 and the front pivot axis 290 are at the same height and forward of the second connection point C2 and above and rearward of the third connection point C3. The first connection point C1 of the right rear lifting bracket 245 and the rear pivot axis 295 are at the same height and forward of the second connection point C2 and below and forward of the third connection point C3.

The first line L1 is horizontal, and consequently the deck moment arm DM is maximized in this position. The deck moment arm DM is equal to the distance between the first and second connection points C1, C2. A push arm stabilizes forward and rearward swinging of the deck assembly 155 and causes the deck assembly 155 to follow an arcuate path as it is raised and lowered, consequently, between the full-down and full-up positions, the lifting links 270 are swept forward in the illustrated embodiment. The downward component of weight W of the deck assembly 155 is still borne entirely by the deck lifting brackets 220, 225, 240, 245 at connection point C2. The deck moment is therefore the portion of weight W borne by the brackets 220, 225, 240, 245 multiplied by the distance between points C1 and C2.

Because the second line L2 is not perpendicular to the spring line of force F, the spring moment arm SM is not maximized, although it is larger than in the full-down position. The spring force F is reduced a little because the third connection points C3 are closer to each other than in the full-down position.

Figure 5:
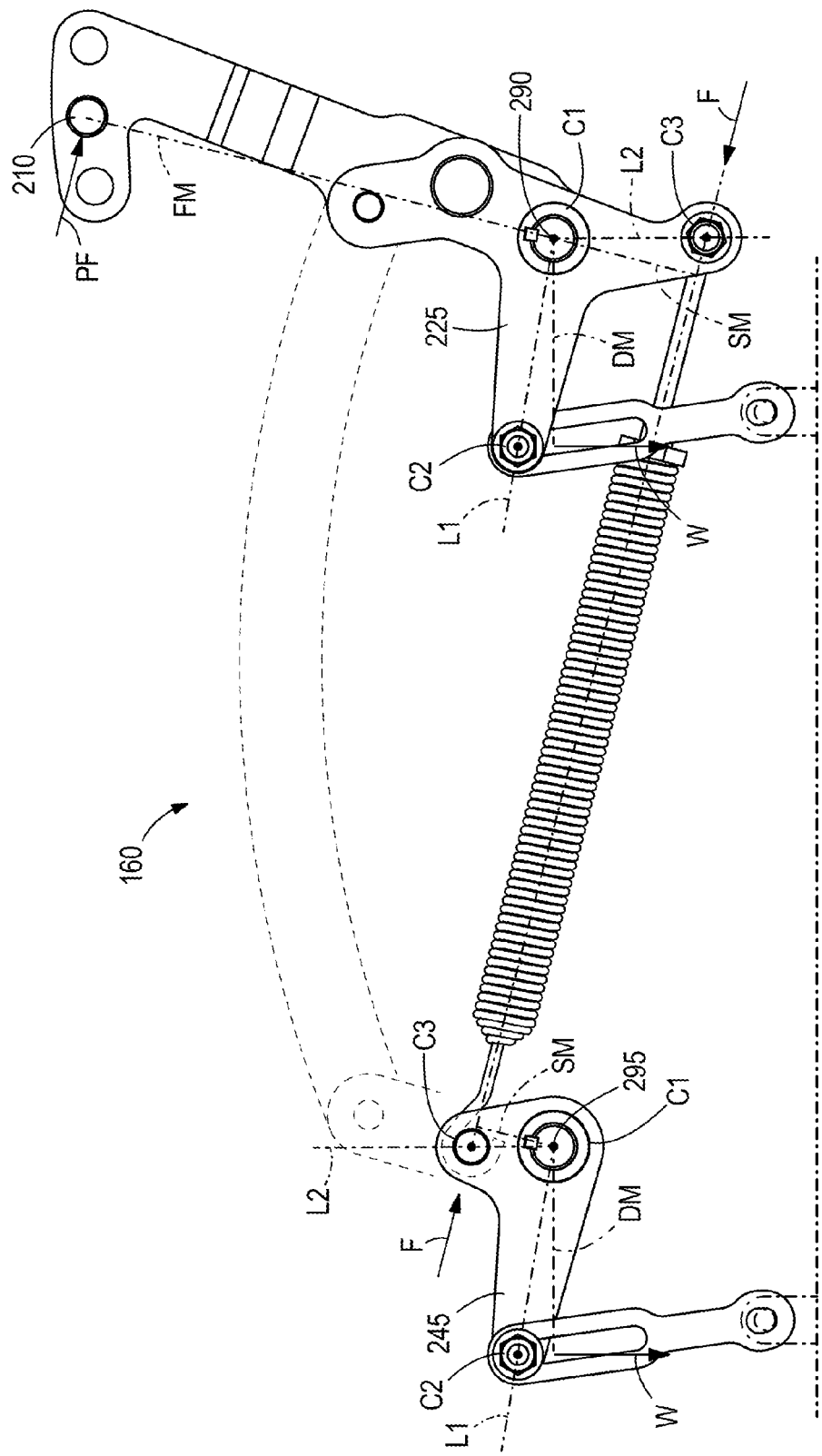
FIG. 5 is a side view of the deck lifting assembly in a third position.

FIG. 5 illustrates the deck lifting assembly 160 in a third position, in which the first connection point C1 of the right front lifting bracket 225 and the front pivot axis 290 are below and forward of the second connection point C2 and directly above the third connection point C3. The first connection point C1 of the right rear lifting bracket 245 and the rear pivot axis 295 are below and forward of the second connection point C2 and directly below the third connection point C3. The second line L2 for both brackets 225, 245 is vertical but not perpendicular to the spring line of force F, so the spring moment arm SM is not maximized. The deck moment arm DM is smaller than in FIG. 4. The spring force F continues to shrink as the third connection points C3 draw closer to each other.

Figure 6:
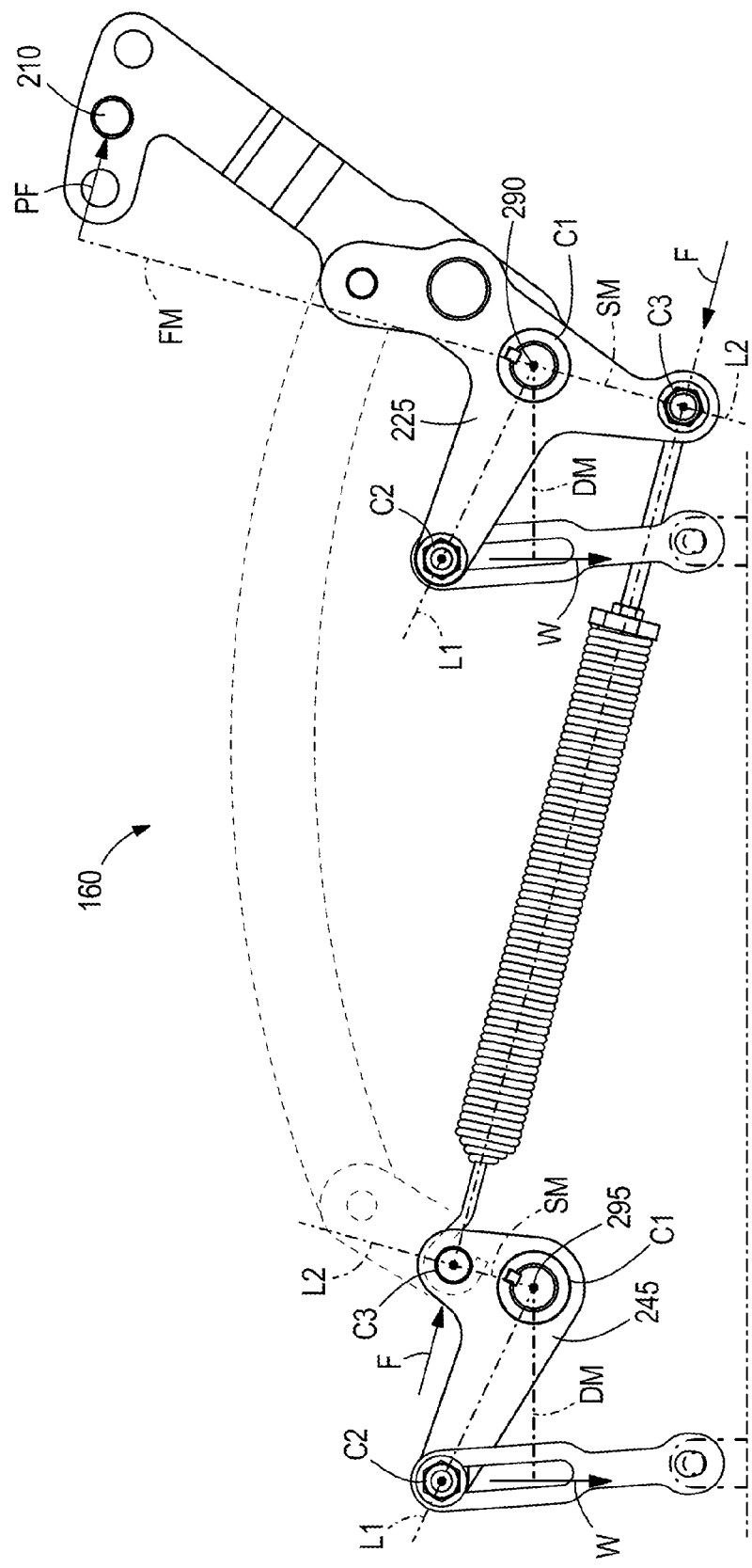
FIG. 6 is a side view of the deck lifting assembly in a fourth position.

FIG. 6 illustrates the deck lifting assembly 160 in a fourth position, in which the first connection point C1 of the right front lifting bracket 225 and the front pivot axis 290 are below and forward of the second connection point C2 and above and forward of the third connection point C3. The first connection point C1 of the right rear lifting bracket 245 and the rear pivot axis 295 are below and forward of the second connection point C2 and below and rearward of the third connection point C3. The second line L2 is perpendicular to the spring line of force F and the spring moment arm SM is consequently maximized in this position. The spring moment arm SM is equal to the distance between the first and third connection points C1, C3. The spring torque applied to the brackets 225, 245 is equal to the spring force F multiplied by the distance between the first and third connection points C1, C3. The spring force F is lower in this position than in the previous figures. The deck moment arm DM is smaller than in FIG. 5 and is similar to the deck moment arm length in FIG. 3.

Figure 7:
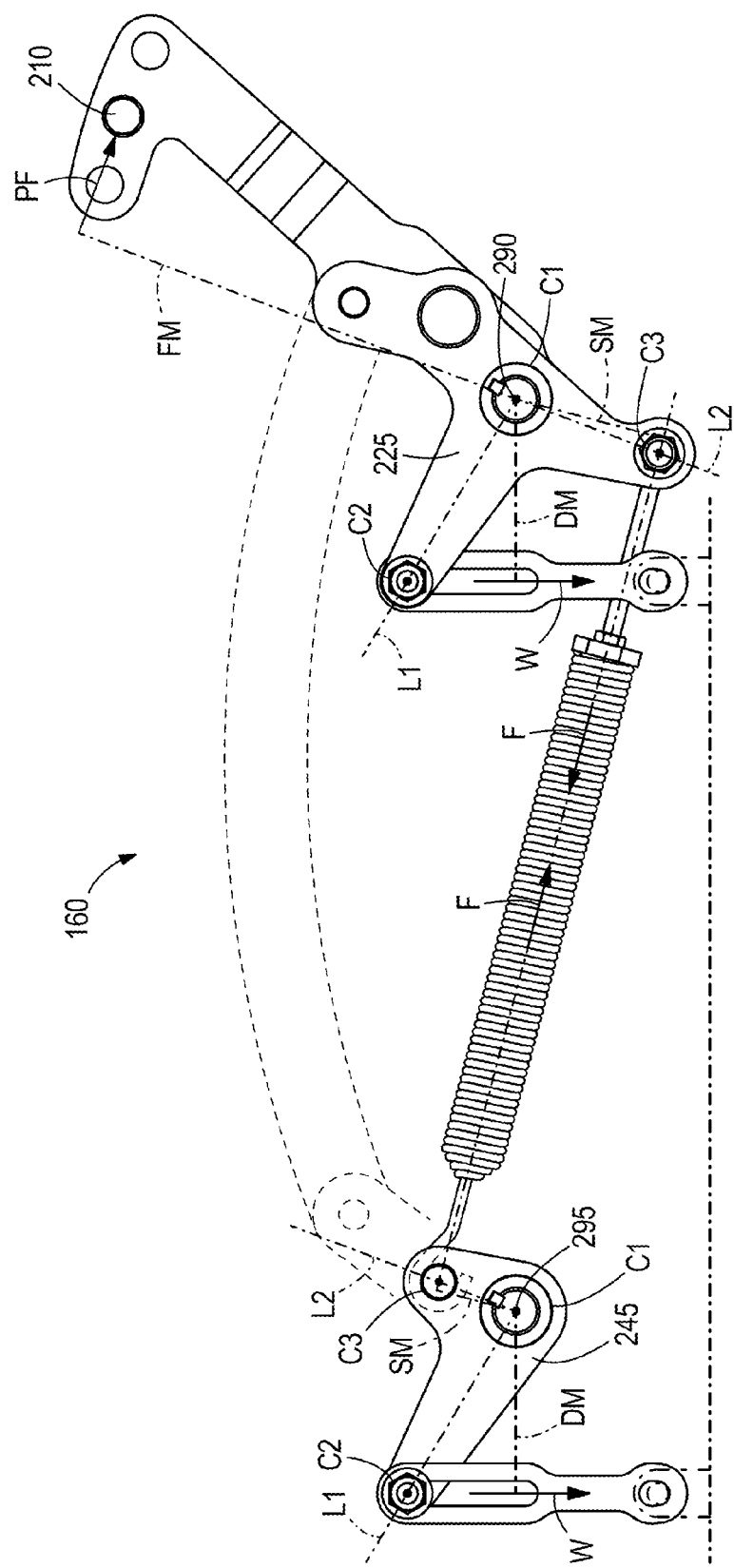
FIG. 7 is a side view of the deck lifting assembly in a full-up position.

FIG. 7 illustrates the deck lifting assembly 160 in a "full up" position. In this position, the spring force F is at a minimum, but so is the deck moment arm DM. The angle between the second line L2 and the spring moment arm SM is relatively small, so the spring moment arm is relatively large. The first connection point C1 of the right front lifting bracket 225 and the front pivot axis 290 are below and forward of the second connection point C2 and above and forward of the third connection point C3. The first connection point C1 of the right rear lifting bracket 245 and the rear pivot axis 295 are below and forward of the second connection point C2 and below and rearward of the third connection point C3.

With reference to FIGS. 4-7, the user input force or pedal force is identified as PF, and is directed onto the foot pedal 210 from an expected angle for an operator sitting in the seat. The effective moment arm to which the pedal force PF is applied to pivot the front pivot shaft 230 and the entire deck lifting assembly 160 is identified as FM. For the purpose of example, the invention will be discussed with respect to three deck assembly 155 sizes, each having a weight, and a spring gap setting for the preload adjustment mechanism 315 (i.e., the space between the end of the biasing member and just short of the point C3), as in the following Table 1:

TABLE 1

| Example Decks | | |
|---|---|---|
| Deck Size | Weight | Spring Gap |
| 52" | 280 lbs. | 3.5" |
| 60" | 291 lbs. | 3.0" |
| 72" | 375 lbs. | 0.0" |

Figure 11:
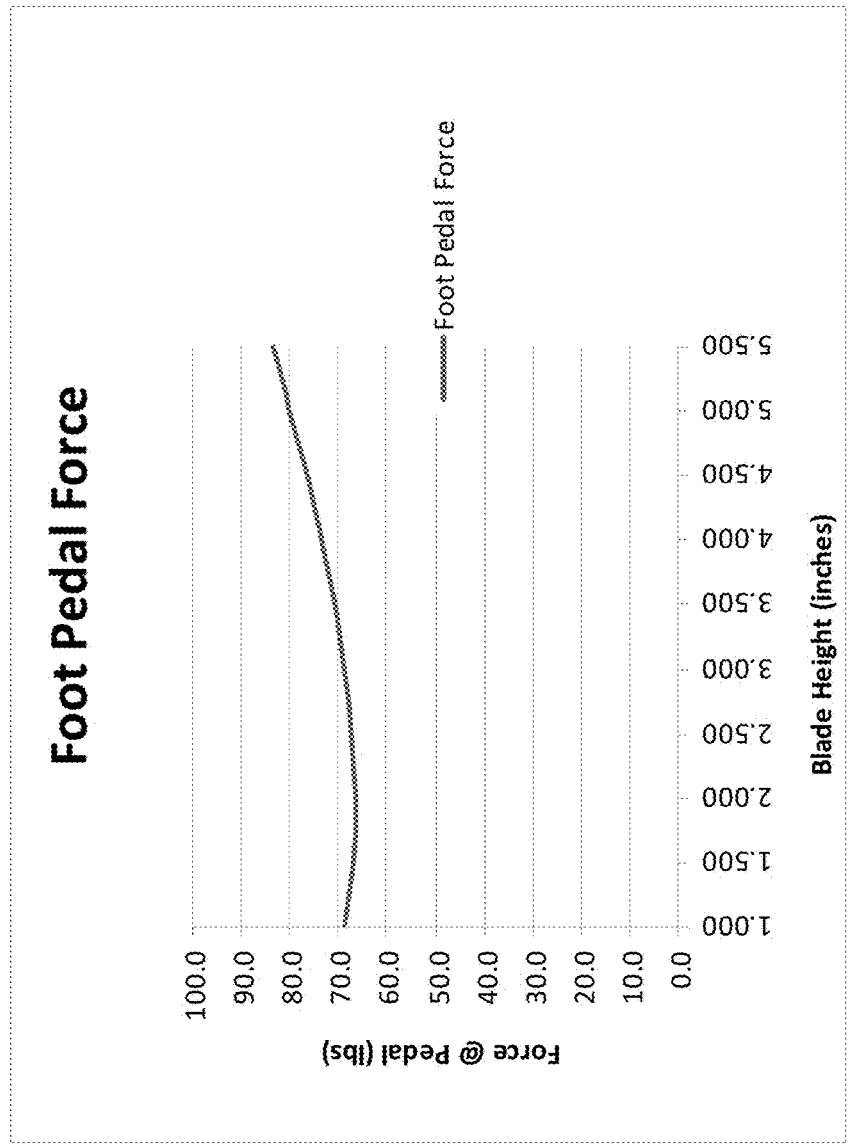
FIGS. 11-13 are plots of pedal force to blade height for three different sizes of cutting decks.
Figure 12:
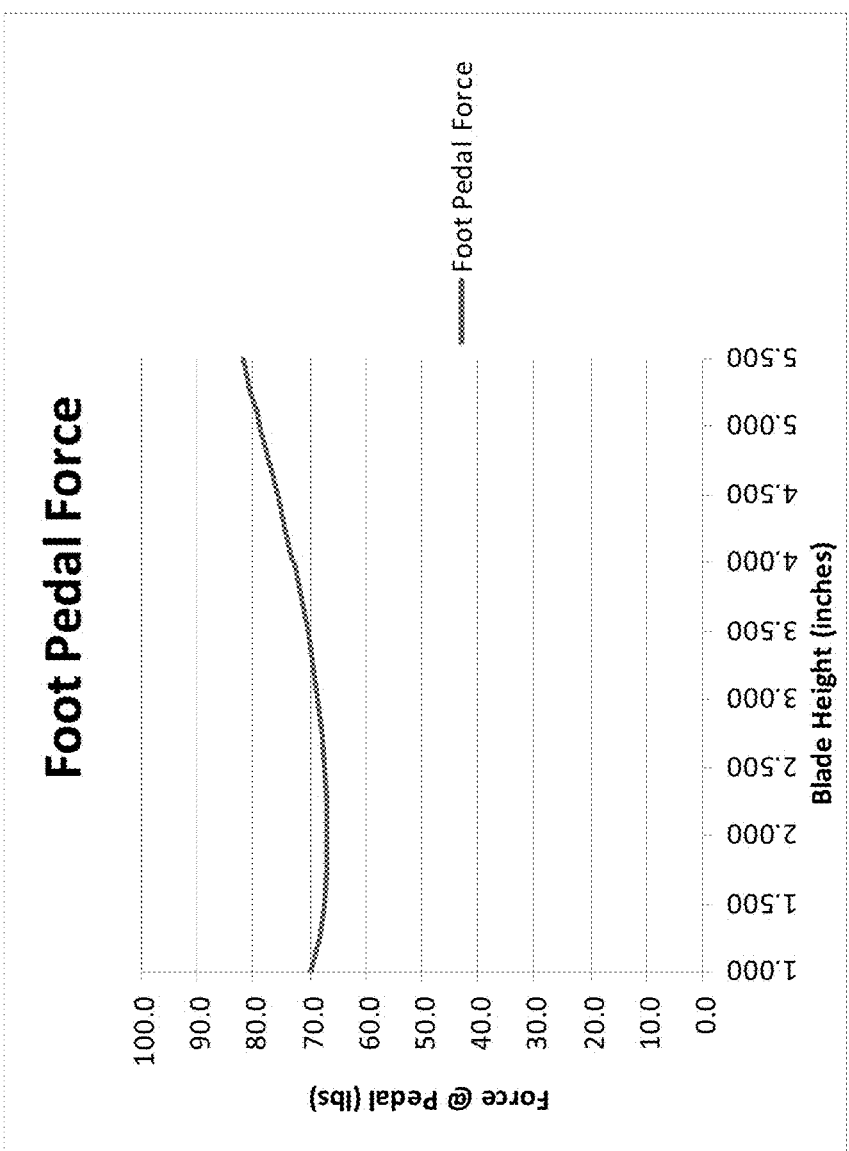
Figure 13:
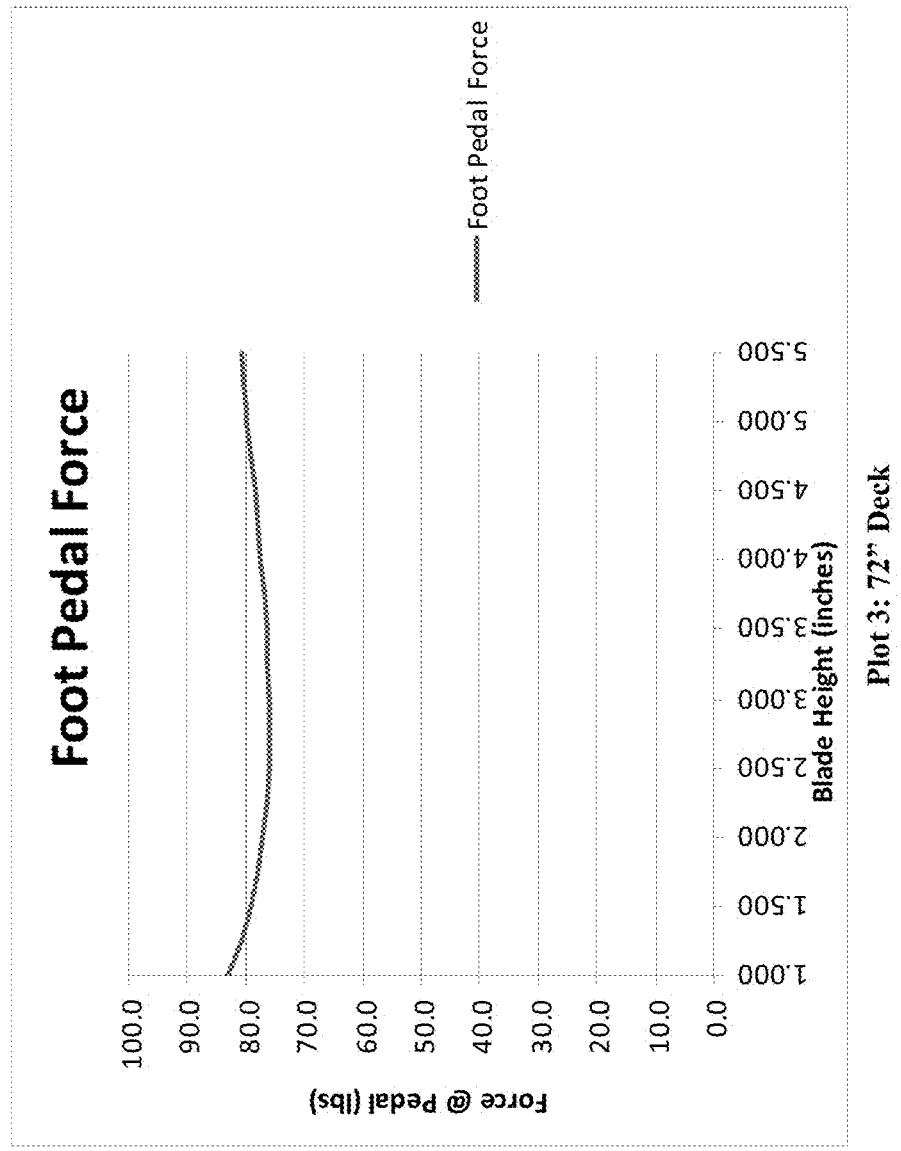

The foot pedal force PF is plotted in Plots 1, 2, and 3 (FIGS. 11-13) for the three examples through the range of motion of the deck lifting assembly 160:

The pedal forces for the several examples above vary as shown in the following Table 2:

TABLE 2

| Pedal Force Analysis for 52", 60", and 72" Decks | | | |
|---|---|---|---|
|  | 52" | 60" | 72" |
| Avg PF (lbs) | 72.4 | 72.1 | 78.2 |
| Max PF (lbs) | 83.4 | 82.0 | 83.1 |
| Min PF (lbs) | 66.5 | 66.9 | 76.0 |
| Mid PF (lbs) | 75.0 | 74.4 | 79.5 |
| +/− from Mid (lbs.) | 8.5 | 7.6 | 3.5 |
| +/− from Mid (%) | 11.3 | 10.2 | 4.4 |
| Min/Max (%) | 79.7 | 81.5 | 91.5 |

Because of the moment arms and forces in the various positions illustrated and described above, the user applies a substantially constant pedal force PF to the foot pedal 210 throughout the entire range of motion, and there are no large spikes or dips in the required pedal force PF. Substantially constant means the minimum pedal force PF is more than 75% in some embodiments, 85% in other embodiments, and 90% in other embodiments, and the maximum and minimum pedal forces vary from the midpoint between them by no more than about 15% in some embodiments, 12% in other embodiments, 11% in other embodiments, and 5% in other embodiments.

Additionally, in view of Plots 1, 2, and 3 (FIGS. 11-13), the portions of range of motion in which the required pedal force PF increases tend to be associated with points at which the operator has more leverage and the leg at the most favorable angles to apply PF perpendicular to the moment arm of the foot pedal 210. As the foot pedal 210 rises through the range of motion and the knee of the operator drops (i.e., in the later half of the range of motion), more of the leg force is used to apply torque to the foot pedal 210 and the operator effort becomes more efficient. Consequently, any small increase in required pedal input force is easily accommodated by the more efficient application of force by the operator and the perceived effort is less likely to be noted by the operator.

Figure 8:
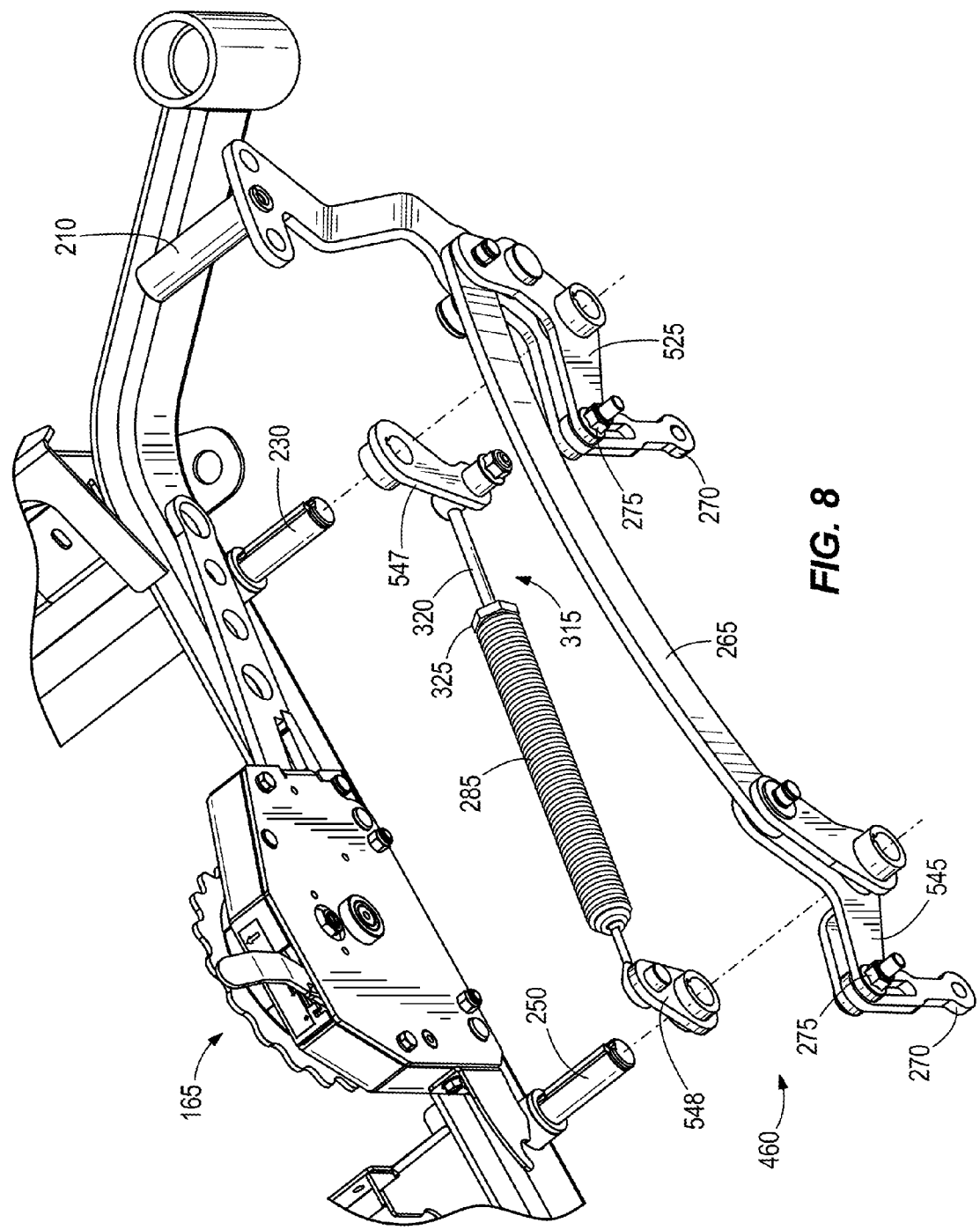
FIG. 8 is an exploded view of another configuration of the deck lifting assembly.
Figure 9:
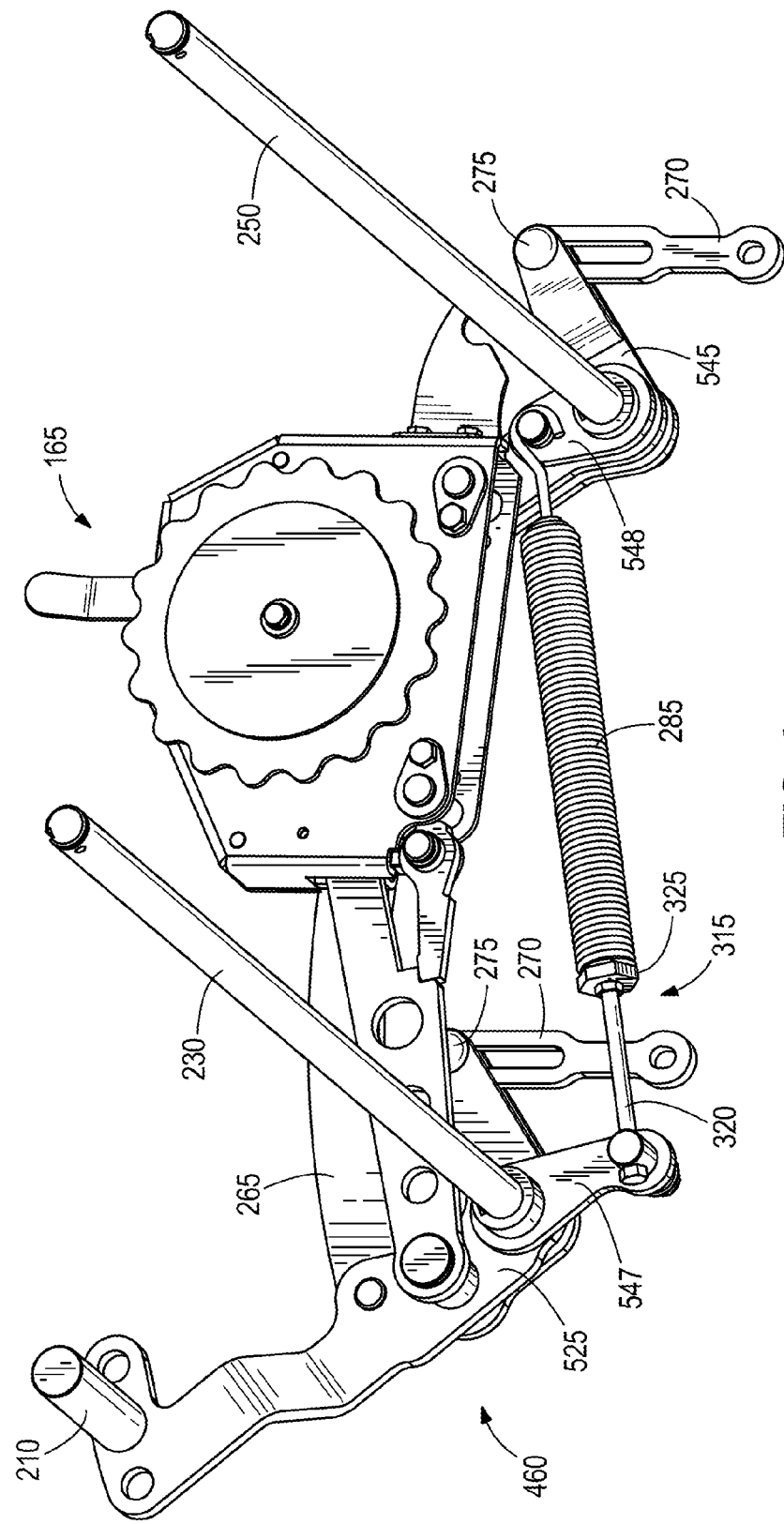
FIG. 9 is a perspective view of the configuration of FIG. 8.
Figure 10:
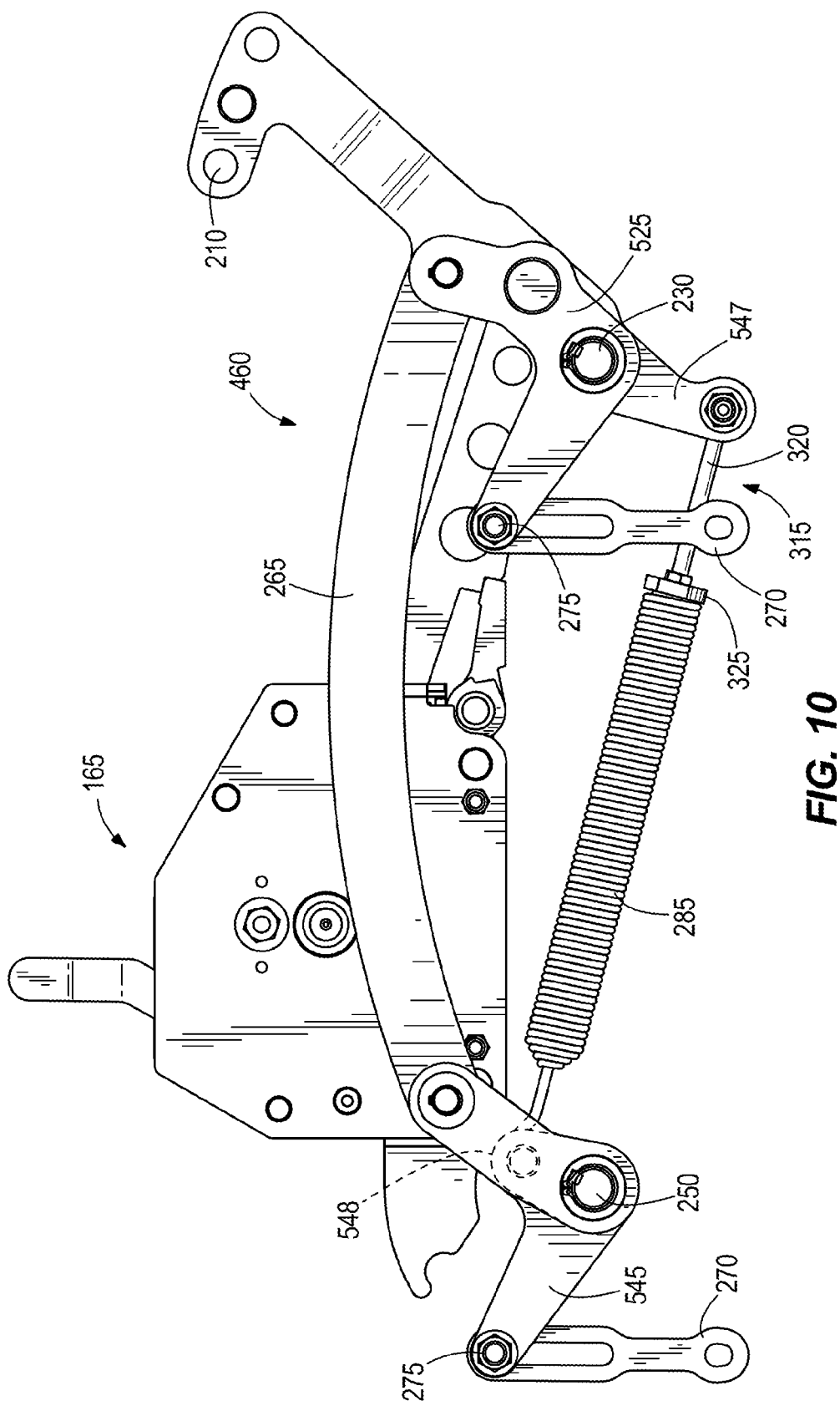
FIG. 10 is a side view of the configuration of FIG. 8.

FIGS. 8-10 illustrate an alternative deck lifting assembly 460 construction or embodiment. The alternative deck lifting assembly 460 is identical or substantially similar to the deck lifting assembly 160 discussed above, with the exception that the alternative deck lifting assembly 460 provides separate deck lifting brackets and biasing brackets (or spring brackets). Like components in the alternative embodiment 460 are given the same reference numbers as used for the embodiment 160 discussed above. It will be understood that both the right and left assemblies in the alternative embodiment 460 can be modified with separate lifting and biasing brackets, although only the right side is illustrated.

In addition to the components described above with respect to the first deck lifting assembly 160, the deck lifting assembly 460 includes deck lifting brackets 525, 545 and separate biasing or spring brackets 547, 548. The lifting brackets 525, 545 and the biasing brackets 547, 548 are rigidly mounted to the front and rear pivot shafts 230, 250. The biasing brackets 547, 548 provide mounting points for the ends of the right biasing member 285 (the same is true for the biasing brackets and left biasing member 280 on the left side, not illustrated). In other configurations or embodiments, the biasing members 280, 285 can be mounted at one end to a biasing bracket and at the opposite end to a lifting bracket.

In the appended claims, we refer to the deck lifting brackets 220, 225, 240, 245 (and 525, 545 of the alternative embodiment), in no particular order, as first, second, third, and fourth deck lifting brackets to avoid limiting designations such as forward, rearward, left, and right.

Thus, the invention provides, among other things, a deck lifting assembly in which a substantially constant force can be applied to a deck actuator through the entire range of motion of the deck lifting assembly, and in which biasing members are attached to and act on two lifting brackets. Various features and advantages of the invention are set forth in the following claims.

What is claimed is:

1. A lawn mower comprising:
a frame;
a prime mover supported by the frame;
a mower deck;
a cutting blade mounted below the mower deck to cut vegetation under the mower deck;
a first pivot shaft supported for rotation with respect to the frame about a first horizontal axis;
a second pivot shaft supported for rotation with respect to the frame about a second horizontal axis;
a first lifting bracket rigidly mounted to the first pivot shaft and interconnected to the deck, the first lifting bracket being pivotable about the first horizontal axis in a raising direction to raise the deck and pivotable about the first horizontal axis in a lowering direction to lower the deck;
a second lifting bracket rigidly mounted to the second pivot shaft and interconnected to the deck, the second lifting bracket being pivotable about the second horizontal axis in a raising direction to raise the deck and pivotable about the second horizontal axis in a lowering direction to lower the deck;
a third lifting bracket rigidly mounted to the first pivot shaft and interconnected to the deck, the third lifting bracket being pivotable about the first horizontal axis in a raising direction to raise the deck and pivotable about the first horizontal axis in a lowering direction to lower the deck;
a fourth lifting bracket rigidly mounted to the second pivot shaft and interconnected to the deck, the fourth lifting bracket being pivotable about the second horizontal axis in a raising direction to raise the deck and pivotable about the second horizontal axis in a lowering direction to lower the deck; and
a spring interconnecting the first lifting bracket to the second lifting bracket, the spring imparting a biasing force on each of the first lifting bracket and second lifting bracket, the biasing force imparting torque to the first lifting bracket in the raising direction for the first lifting bracket and imparting torque to the second lifting bracket in the raising direction for the second lifting bracket,
wherein the spring is interconnected to the first lifting bracket above the first horizontal axis and is interconnected to the second lifting bracket below the second horizontal axis.

2. The lawn mower of claim 1, further comprising a second spring interconnected to both the third and fourth lifting brackets, and imparting a biasing force on each of the third and fourth lifting brackets, the biasing force imparting torque to the third lifting bracket in the raising direction for the third lifting bracket and imparting torque to the fourth lifting bracket in the raising direction for the fourth lifting bracket.

3. The lawn mower of claim 1, wherein the spring includes a linear spring; and wherein a first end of the linear spring is interconnected to the first lifting bracket and a second end of the linear spring is interconnected to the second lifting bracket.

4. The lawn mower of claim 3, wherein rotation of the first lifting bracket in its raising direction and rotation of the second lifting bracket in its raising direction causes contraction of the linear spring and a decrease in the biasing force.

5. The lawn mower of claim 1, further comprising a preload adjustment mechanism for preloading the spring to a desired biasing force.

6. The lawn mower of claim 5, wherein the spring includes a linear spring; and wherein the preload adjustment mechanism includes a threaded member interconnected to one end of the linear spring, the threaded member being rotated in a first direction to increase the preload and in a second direction to decrease the preload.

7. The lawn mower of claim 5, wherein the preload adjustment mechanism is interposed between the spring and one of the lifting brackets.

8. The lawn mower of claim 1, further comprising a deck lift lever for actuation of the deck lifting assembly; wherein the applied force to the deck lift lever includes a maximum force and minimum force through the range of motion and wherein the minimum force is greater than 75% of the maximum force.

9. The lawn mower of claim 1, further comprising a synchronizing arm interconnected to each of the first and second lifting brackets, the synchronizing arm imparting rotation to the first lifting bracket in response to rotation of the second lifting bracket.

10. A lawn mower comprising:
a frame;
a prime mover supported by the frame;
a mower deck;
a cutting blade mounted below the mower deck to cut vegetation under the mower deck;

a first pivot shaft supported for rotation with respect to the frame about a first pivot axis;

a second pivot shaft supported for rotation with respect to the frame about a second pivot axis spaced apart from the first pivot axis;

a first lifting bracket rigidly mounted to the first pivot shaft for rotation about the first pivot axis, the first lifting bracket being interconnected to the mower deck to raise and lower the deck in response to pivoting of the first lifting bracket;

a second lifting bracket rigidly mounted to the second pivot shaft for rotation about the second pivot axis, the second lifting bracket being interconnected to the mower deck to raise and lower the deck in response to pivoting of the second lifting bracket;

a third lifting bracket rigidly mounted to the first pivot shaft for rotation about the first pivot axis, the third lifting bracket being interconnected to the mower deck to raise and lower the deck in response to pivoting of the third lifting bracket;

a fourth lifting bracket rigidly mounted to the second pivot shaft for rotation about the second pivot axis, the fourth lifting bracket being interconnected to the mower deck to raise and lower the deck in response to pivoting of the fourth lifting bracket;

a spring interconnected at a first end to the first lifting bracket and interconnected at a second end to the second lifting bracket, the spring providing a biasing force that applies torque to the first and second pivot shafts to bias the first and second lifting brackets in a raising direction; and a synchronizing arm interconnected at a first end to the first lifting bracket or the third lifting bracket, and interconnected at a second end to the second lifting bracket or the fourth lifting bracket, the synchronizing arm imparting rotation to the first lifting bracket or the third lifting bracket in response to rotation of the second lifting bracket or the fourth lifting bracket, wherein both the first end and the second end of the spring move relative to the frame as the mower deck is raised and lowered.

11. The lawn mower of claim 10, further comprising at least one biasing bracket, separate from the first and second lifting brackets, rigidly mounted to at least one of the first and second pivot shafts; wherein the spring is interconnected to the at least one biasing bracket.

12. The lawn mower of claim 10, further comprising a second spring providing a biasing force that applies torque to the first and second pivot shafts to bias the first, second, third, and fourth lifting brackets in the raising direction.

13. The lawn mower of claim 12, wherein the second spring is interconnected to at least one of the third and fourth lifting brackets.

14. The lawn mower of claim 12, further comprising at least one biasing bracket, separate from the first, second, third and fourth lifting brackets, the at least one biasing bracket being rigidly mounted to at least one of the first and second pivot shafts; wherein the second spring is interconnected to the at least one biasing bracket.

15. A lawn mower comprising:

a frame;

a prime mover supported by the frame;

a mower deck;

a cutting blade mounted below the mower deck to cut vegetation under the mower deck;

a first pivot shaft supported for rotation with respect to the frame about a first pivot axis;

a second pivot shaft supported for rotation with respect to the frame about a second pivot axis;

a first lifting bracket rigidly mounted to the first pivot shaft for rotation with the first pivot shaft about the first pivot axis, the first lifting bracket being interconnected to the mower deck to raise and lower the deck in response to pivoting of the first lifting bracket;

a second lifting bracket rigidly mounted to the second pivot shaft for rotation with the second pivot shaft about the second pivot axis, the second lifting bracket being interconnected to the mower deck to raise and lower the deck in response to pivoting of the second lifting bracket;

a third lifting bracket rigidly mounted to the first pivot shaft for rotation with the first pivot shaft about the first pivot axis, the third lifting bracket being interconnected to the mower deck to raise and lower the deck in response to pivoting of the third lifting bracket;

a fourth lifting bracket rigidly mounted to the second pivot shaft for rotation with the second pivot shaft about the second pivot axis, the fourth lifting bracket being interconnected to the mower deck to raise and lower the deck in response to pivoting of the fourth lifting bracket;

a first spring interconnected to both the first and second pivot shafts, the first spring providing a biasing force that applies torque to the first and second pivot shafts to bias the first, second, third, and fourth lifting brackets in a raising direction, without interfacing with the frame;

a second spring spaced apart from the first spring and interconnected to both the first and second pivot shafts, the second spring providing a biasing force that applies torque to the first and second pivot shafts to bias the first, second, third, and fourth lifting brackets in the raising direction, without interfacing with the frame; and at least one biasing bracket, separate from the first, second, third, and fourth lifting brackets, the at least one biasing bracket being rigidly mounted to at least one of the first and second pivot shafts; wherein the second spring is interconnected to the at least one biasing bracket.

* * * * *